(12) United States Patent
Takitani et al.

(10) Patent No.: US 11,806,823 B2
(45) Date of Patent: Nov. 7, 2023

(54) WORKPIECE SUPPORT DEVICE

(71) Applicant: KOMATSU NTC LTD., Nanto (JP)

(72) Inventors: Yoshiyuki Takitani, Toyama (JP); Yuji Kanehira, Toyama (JP); Nobuhito Oki, Toyama (JP)

(73) Assignee: KOMATSU NTC LTD., Nanto (JP)

( * ) Notice: Subject to any disclaimer, the term of this patent is extended or adjusted under 35 U.S.C. 154(b) by 179 days.

(21) Appl. No.: 17/439,980

(22) PCT Filed: Mar. 16, 2020

(86) PCT No.: PCT/JP2020/011379
§ 371 (c)(1),
(2) Date: Sep. 16, 2021

(87) PCT Pub. No.: WO2020/189613
PCT Pub. Date: Sep. 24, 2020

(65) Prior Publication Data
US 2022/0395943 A1 Dec. 15, 2022

(30) Foreign Application Priority Data
Mar. 18, 2019 (JP) .................................. 2019-049815

(51) Int. Cl.
*B23Q 1/25* (2006.01)
*B23Q 3/06* (2006.01)

(52) U.S. Cl.
CPC .................................... *B23Q 1/25* (2013.01); *B23Q 3/06* (2013.01)

(58) Field of Classification Search
CPC ... B23Q 1/25; B23Q 1/26; B23Q 1/38; B23Q 1/50; B23Q 1/52; B23Q 1/522;
(Continued)

(56) References Cited

U.S. PATENT DOCUMENTS 5,747,894 A 5/1998 Hirai et al.
8,672,819 B2 * 3/2014 Sakane .............. B23Q 11/0042
409/137
(Continued)

FOREIGN PATENT DOCUMENTS

JP H07249531 A 9/1995
JP H1058254 A 3/1998
(Continued)

OTHER PUBLICATIONS

Machine translation of JP-2001353632-A (Year: 2001).*
Machine translation of JP-2014161995-A (Year: 2014).*
Machine translation of KR-101856196-B1 (Year: 2018).*

*Primary Examiner* — Lee D Wilson
*Assistant Examiner* — Robert F Neibaur
(74) *Attorney, Agent, or Firm* — Maschoff Brennan

(57) ABSTRACT

A workpiece support device includes: a jig, a table, a rotating shaft, a support member, a flow path connector, and a supply-side connecting portion. The jig has a main flow path to flow a fluid for machining and a sub-flow path, and fixes the workpiece. The table has a table flow path to communicate with the main flow path and is attached with the jig. The rotating shaft has a rotating shaft flow path to communicate with the table flow path, and is fixed to the table. The support member rotatably supports the rotating shaft. The flow path connector connects the rotating shaft flow path with a fluid-supply path to communicate with a fluid-supply side so as to relatively rotate with each other about an axis of the rotating shaft. The supply-side connecting portion moves relative to the jig to communicate with and block off the sub-flow path.

7 Claims, 6 Drawing Sheets

(58) Field of Classification Search
CPC ...... B23Q 1/54; B23Q 1/5475; B23Q 1/4857; B23Q 1/287; B23Q 1/5437; B23Q 3/06
USPC .................................. 269/20, 281.1, 281.3
See application file for complete search history.

(56) References Cited

U.S. PATENT DOCUMENTS 9,004,830 B2 * 4/2015 Ura .................. F16L 39/04
               409/201
2008/0047120 A1 * 2/2008 Soroka ............. B23Q 11/127
               409/168

FOREIGN PATENT DOCUMENTS

| | | | |
|---|---|---|---|
| JP | 2001353632 A | * | 12/2001 |
| JP | 2001353632 A | | 12/2001 |
| JP | 2005-161455 A | | 6/2005 |
| JP | 2010125552 A | | 6/2010 |
| JP | 2014161995 A | * | 9/2014 |
| JP | 2014161995 A | | 9/2014 |
| KR | 101856196 B1 | * | 5/2018 |

* cited by examiner

WORKPIECE SUPPORT DEVICE

TECHNICAL FIELD

The present invention relates to a workpiece support device which supports a workpiece as an object to be machined.

BACKGROUND ART

A machine tool such as a machining center is equipped with a workpiece support device to support a workpiece as an object to be machined. The workpiece support device generally includes a jig for fixing the workpiece. The workpiece is fixed by workpiece clamping devices provided on the jig to clamp the workpiece. A fluid is supplied to the workpiece clamping devices to switch between clamping and unclamping, based on fluid pressure. Further, the jig includes devices such as a workpiece lifter, to be operated by the fluid of a workpiece posture controller to control a posture of the workpiece, or the like, in addition to the workpiece clamping devices.

There is a workpiece support device including a table which is attached with a jig and is rotatable about a rotating shaft fixed to the table, to perform machining on a workpiece from various directions. In this case, a rotary joint is generally used to supply a fluid from a fixed portion, such as a support member supporting the rotating shaft, to the jig via the rotating shaft in rotation.

In this case, the rotary joint needs to be formed with a plurality of flow paths for supplying the fluid to the devices such as the workpiece clamping devices and the workpiece posture controller. Therefore, the rotary joint has an elongated shaft and an increased diameter, which, in turn, leads to an increase in size and weight of the workpiece support device.

To avoid the problem described above, a technique is proposed to provide a jig having connecting portions to keep fluid pressure in flow paths, so that the fluid pressure is kept in the jig and the jig is separated from supply-side connecting portions through which a supplied fluid flows (see Patent documents 1 and 2) at a time of machining. With this technique, the fluid pressure does not need to be supplied to the jig at the time of machining. Therefore, even when the table to which the jig is attached is rotatable, a rotary joint is not required.

PATENT DOCUMENTS

Patent Document 1: Japanese Patent Application Publication No. H7-249531
Patent Document 2: Japanese Patent Application Publication No. 2005-161455

SUMMARY OF THE INVENTION

Problems to be Solved

However, with the technique described in Patent Documents 1 and 2, the fluid pressure in the flow paths of the jig at the time of machining is kept only by the connecting portions of the jig, which can keep the fluid pressure. Accordingly, if the fluid pressure in the flow paths of the jig cannot be kept and is lowered, a case of the workpiece being displaced on the jig at the time of machining, for example, cannot be handled and reliability of machining may be decreased.

An object of the present invention is to provide a workpiece support device reduced in size and weight while reliability of machining is increased.

Solution to Problem

To solve the problem described above, the present invention provides a workpiece support device for supporting a workpiece as an object to be machined, including: a jig, a table, a rotating shaft, a support member, a flow path connector, and a supply-side connecting portion. The jig has a main flow path to flow a fluid required for machining and a sub-flow path different from the main flow path, and fixes the workpiece. The table has a table flow path to communicate with the main flow path and is attached with the jig. The rotating shaft has a rotating shaft flow path to communicate with the table flow path, and is fixed to the table. The support member rotatably supports the rotating shaft. The flow path connector connects the rotating shaft flow path of the rotating shaft with a fluid-supply path to communicate with a fluid-supply side so as to relatively rotate with each other about an axis of the rotating shaft. The supply-side connecting portion is moved relative to the jig to communicate with and block off the sub-flow path, and flows a supplied fluid.

Advantageous Effects of the Invention

The present invention provides a workpiece support device reduced in size and weight while reliability of machining is increased.

EMBODIMENTS OF THE INVENTION

A description is given of an embodiment of the present invention with reference to the drawings as appropriate.

Note that common or similar elements are denoted by the same symbols, and duplicate descriptions thereof are omitted.

Figure 1:
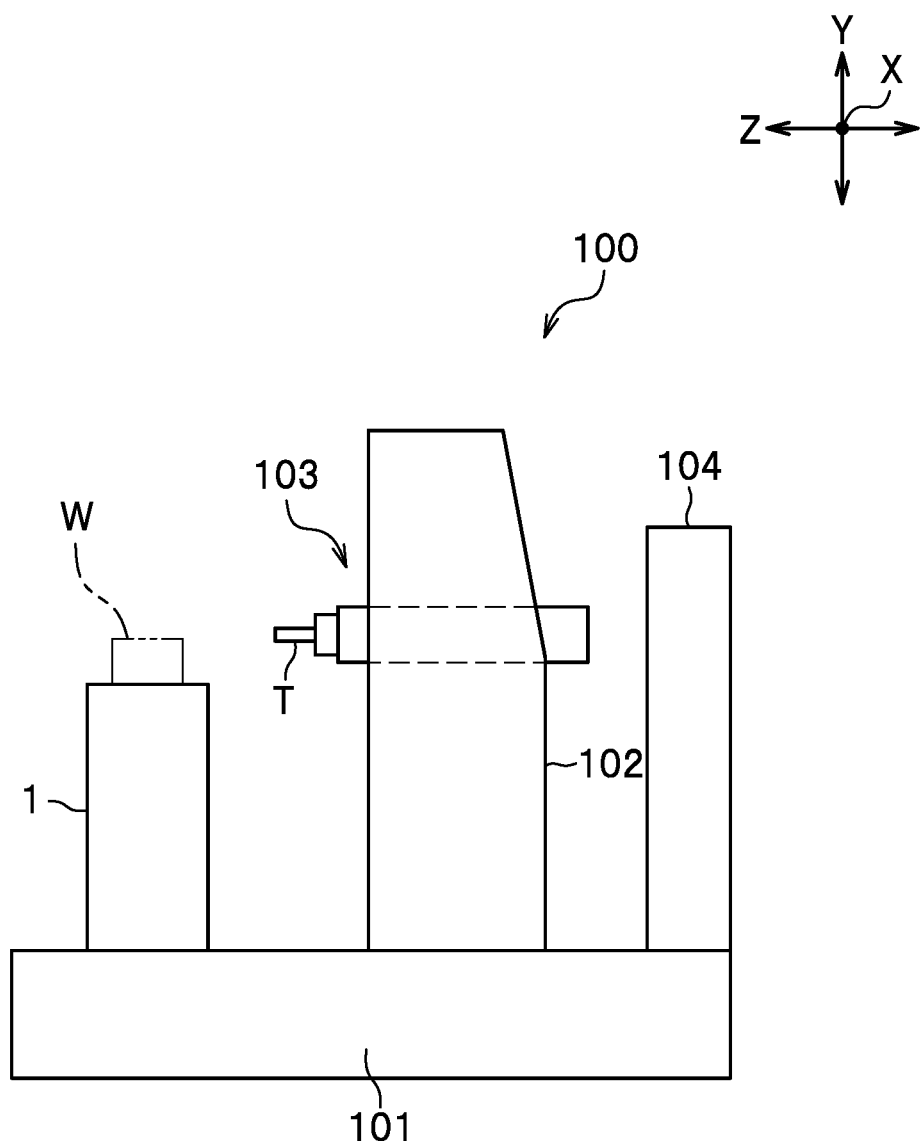
FIG. 1 is a side view schematically illustrating a machine tool provided with a workpiece support device according to an embodiment of the present invention.

FIG. 1 is a side view schematically illustrating a machine tool 100 mounted with a workpiece support device 1 according to an embodiment of the present invention. Hereinbelow, for the purpose of illustration, a left side in FIG. 1 may be referred to as a "front" side, and a right side in FIG. 1 may be referred to as a "rear" side.

As illustrated in FIG. 1, in the present embodiment, the machine tool 100 is a horizontal-type machine tool in which a spindle driving device 103 is arranged in the horizontal direction. The machine tool 100 includes a base 101, a column 102, the spindle driving device 103, a workpiece support device 1, and a control panel 104.

The column 102 is provided on the base 101 so as to be moved relative to the base 101 in an X-axis direction (direction orthogonal to a paper surface on which FIG. 1 is illustrated). The column 102 is moved in the X-axis direction by screwing a screw shaft (not shown), driven by a motor (not shown) attached to the base 101, in forward/reverse rotation directions. The spindle driving device 103 is provided to move in a Y-axis direction (vertical direction) relative to the column 102. The spindle driving device 103 is moved in the Y-axis direction by screwing a screw shaft (not shown), driven by a motor (not shown) attached to the column 102, in forward/reverse rotation directions.

The workpiece support device 1 supports a workpiece W as an object to be machined. In the present embodiment, the workpiece support device 1 is provided so as to be moved in a Z-axis direction (front-rear direction) relative to the base 101. The workpiece support device 1 is moved in the Z-axis direction by screwing a screw shaft (not shown), driven by a motor (not shown) attached to the base 101, in forward/reverse rotation directions.

The machine tool 100 performs machining on the workpiece W with a tool T attached to a distal end of a spindle to be rotated (not shown) of the spindle driving device 103. The control panel 104 integrally controls operation of each part of the machine tool 100.

Figure 2:
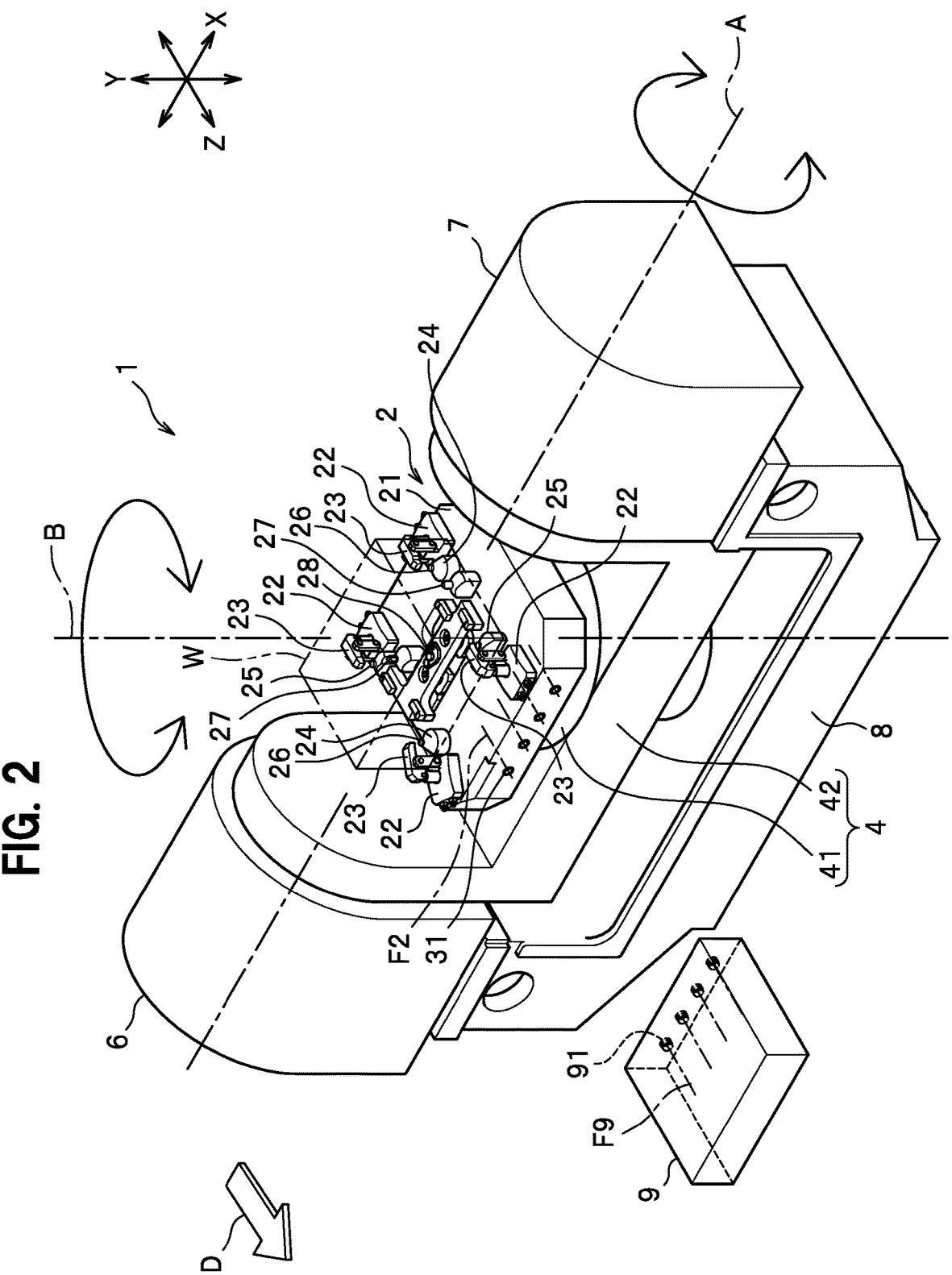
FIG. 2 is a perspective view of the workpiece support device according to the present embodiment.
Figure 3:
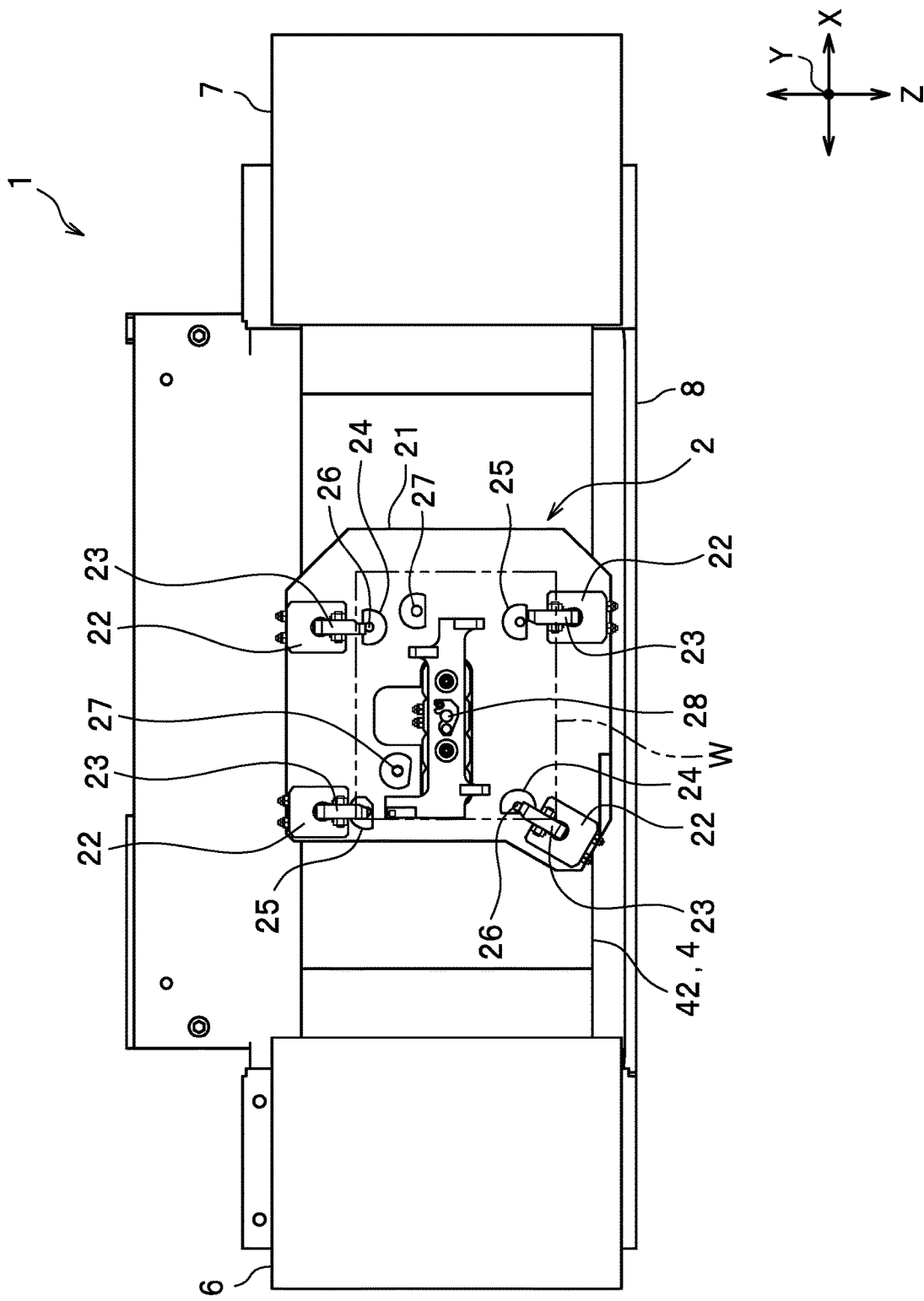
FIG. 3 is a plan view of the workpiece support device according to the present embodiment.
Figure 4:
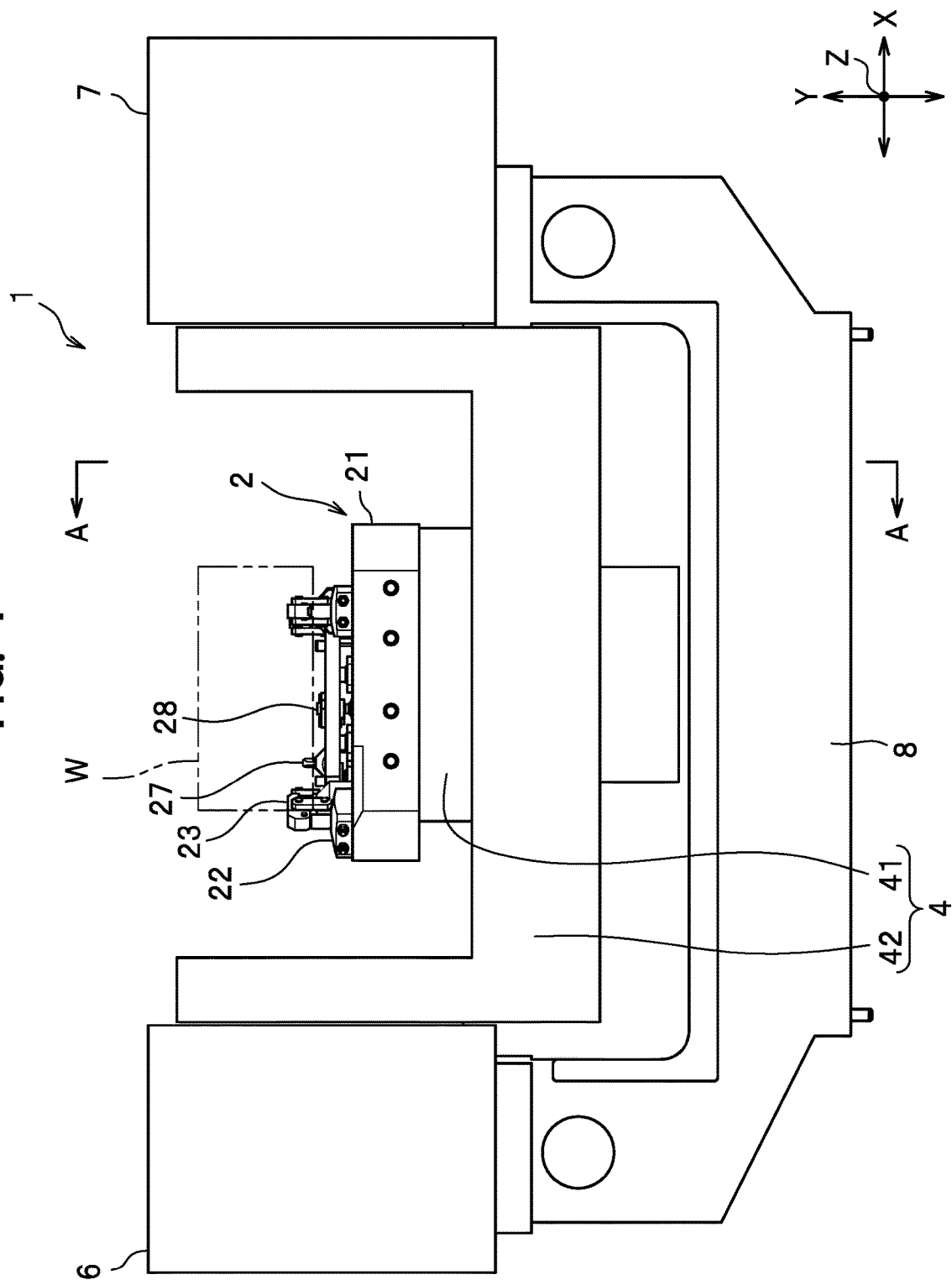
FIG. 4 is a front view of the workpiece support device according to the present embodiment.
Figure 5:
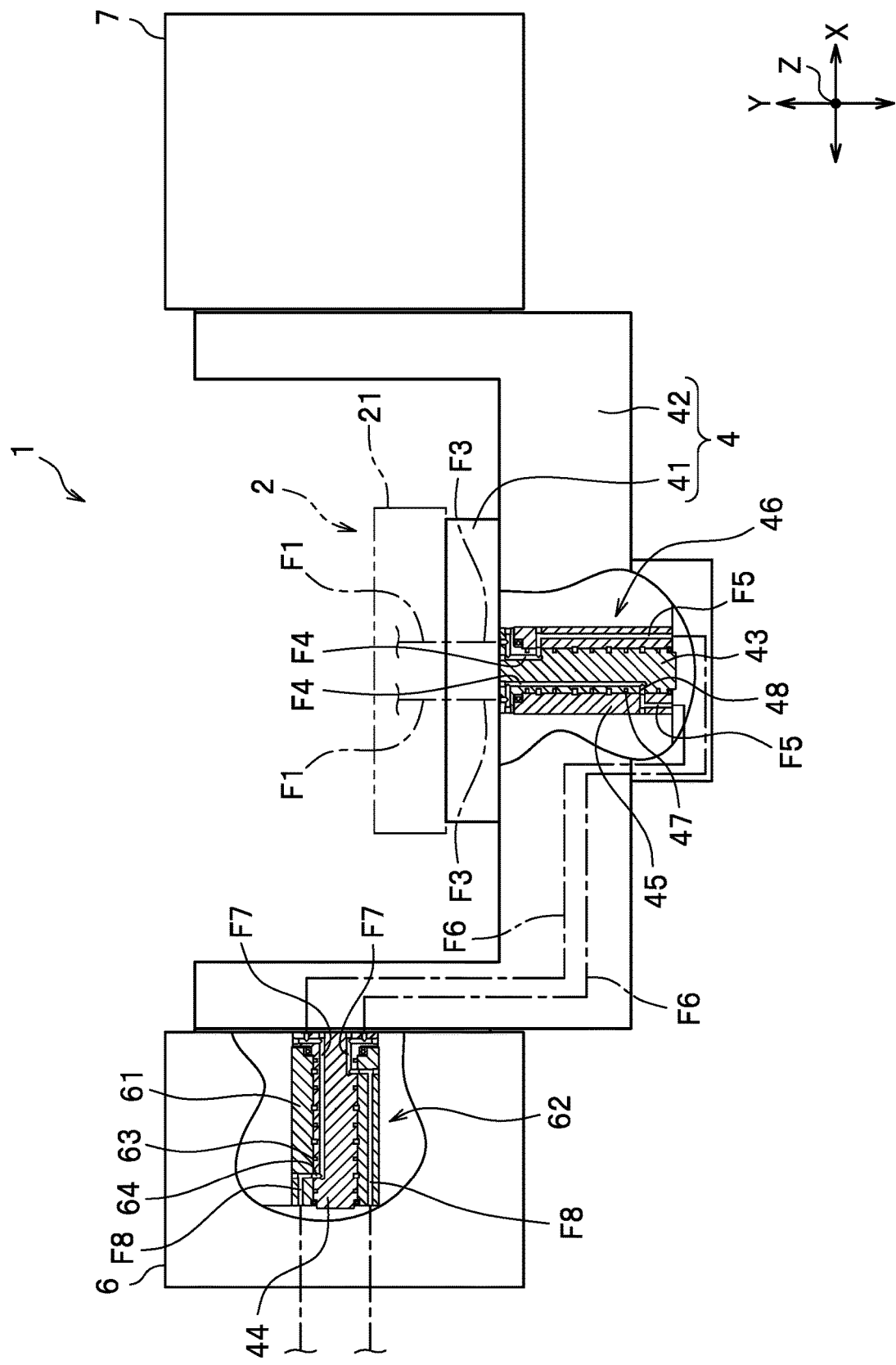
FIG. 5 is a schematic diagram illustrating flow paths continuous to main flow paths of a jig.
Figure 6:
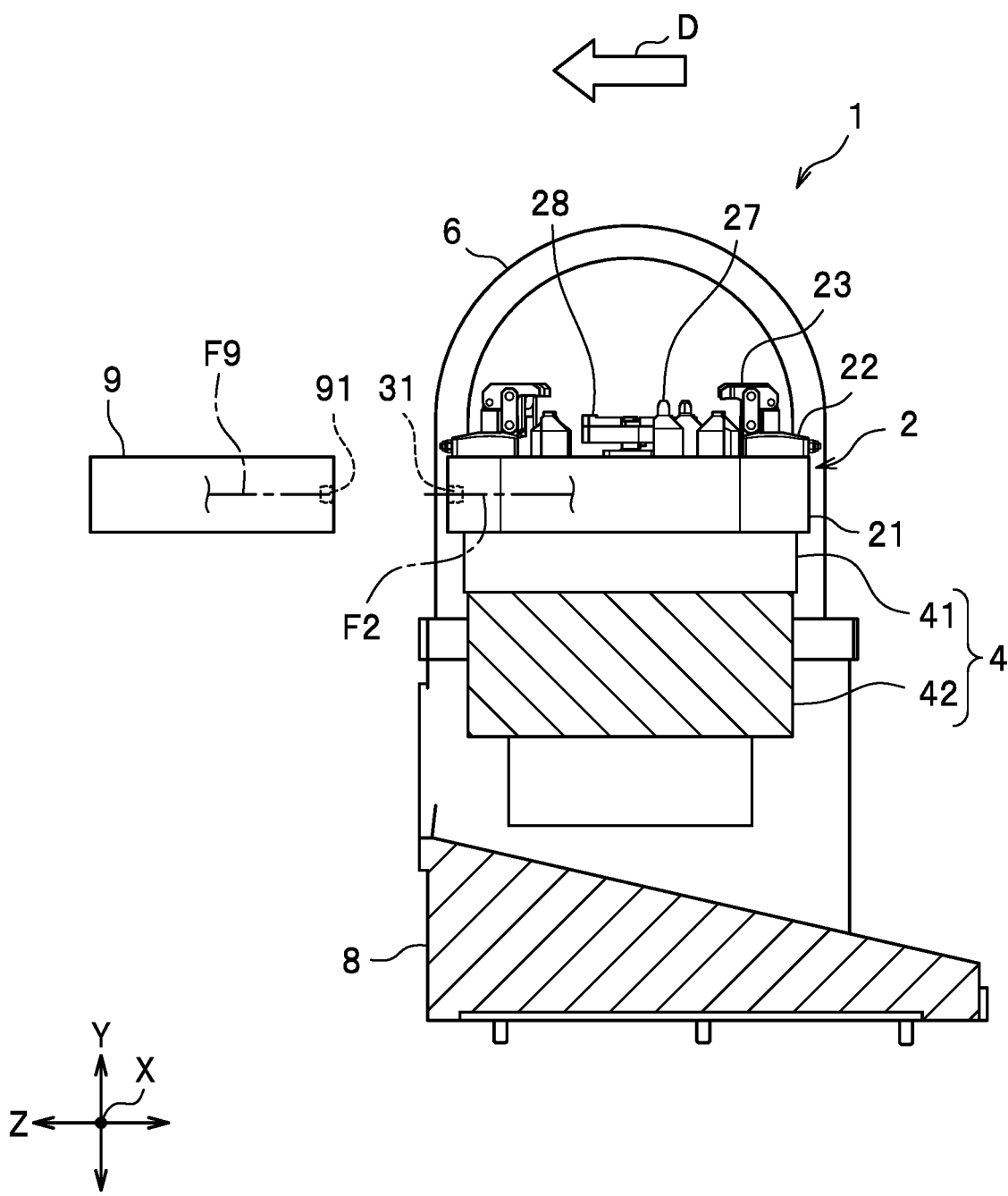
FIG. 6 is a cross-sectional view taken along a line IV-IV in FIG. 4.

FIG. 2 is a perspective view of the workpiece support device 1 according to the present embodiment. FIG. 3 is a plan view of the workpiece support device 1 according to the present embodiment. FIG. 4 is a front view of the workpiece support device 1 according to the present embodiment. FIG. 5 is a schematic diagram illustrating flow paths continuous to main flow paths F1 of the jig 2. FIG. 6 is a cross-sectional view taken along a line IV-IV in FIG. 4. Note that a fixed member 9 is not illustrated in FIGS. 3 and 4.

As illustrated in FIG. 2, the workpiece support device 1 includes a jig 2, a table 4, support bases 6, 7, a carriage 8, and the fixed member 9.

The workpiece W is fixed on the jig 2 for machining with a tool T (see FIG. 1). The jig 2 includes a jig body 21 in a plate shape attached to the table 4.

As illustrated in FIG. 5, the jig 2 is formed with main flow paths F1 to flow a fluid required for machining. The main flow paths F1 are formed in the jig body 21. The four main flow paths F1 (4 routes) are formed in this case, but only two (2 routes) are illustrated in FIG. 5.

Further, as illustrated in FIGS. 2 and 6, the jig 2 is formed with sub-flow paths F2 different from the main flow paths F1. The sub-flow paths F2 are formed in the jig body 21. The four sub-flow paths F2 (4 routes) are formed in this case. Note that the number (number of routes) of the main flow paths F1 and sub-flow paths F2 may be changed as appropriate.

As illustrated in FIGS. 2 to 4, workpiece clamping devices 22 for clamping the workpiece W are provided on the jig body 21. Each workpiece clamping device 22 is provided with a lever 23 which is tilted by motion of a piston (not shown) operated with pressure of hydraulic oil (fluid) supplied to the workpiece clamping device 22 via the main flow path F1 of the jig 2. When hydraulic pressure is supplied to clamping flow paths (not shown) formed in the workpiece clamping devices 22, distal ends of the levers 23 are moved down to press held portions of the workpiece W toward clamping pedestals 24 and 25, so as to clamp the workpiece W. Meanwhile, when the hydraulic pressure is supplied to unclamping flow paths (not shown) formed in the workpiece clamping devices 22, the distal ends of the levers 23 are moved up to be away from the held portions of the workpiece W, so as to unclamp the workpiece W. That is, the two (routes) main flow paths F1 of the four (routes) main flow paths F1 are used as a flow path to communicate with a workpiece clamping flow path and a flow path to communicate with a workpiece unclamping flow path, respectively.

Further, seating detectors 26 for detecting seating of the workpiece W on the jig 2 are provided on the jig body 21. The seating detectors 26 have seating detection paths (not shown) formed in the two clamp pedestals 24 provided at diagonal positions of the clamp pedestals 24, 25 used for the four workpiece clamping devices 22. Air (fluid) supplied via the main flow paths F1 of the jig 2 flows through the seating detection paths. That is, two (routes) of the four (routes) main flow paths F1 are used as the seating detection paths. When the workpiece W is seated on the clamp pedestals 24 in a correct posture, a lower surface of the workpiece W and upper surfaces of the clamp pedestals 24 are in close contact with each other so that the air does not leak. Therefore, pressure in the seating detection paths is hardly changed. In contrast, when the workpiece W is seated on the clamp pedestals 24 in an inclined posture, for example, a gap is made between the lower surface of the workpiece W and the upper surfaces of the clamp pedestals 24 so that the air leaks. Therefore, the pressure in the seating detection paths is slightly decreased. Due to the pressure decrease, it is detected that the workpiece W is not seated on the clamp pedestals 24 in a correct posture.

Further, locator pins 27 and a workpiece lifter 28 are provided on the jig body 21. The locator pins 27 are fitted into locator holes (not shown) formed in the workpiece W to position the workpiece W on the jig 2. The workpiece lifter 28 moves the workpiece W on the jig 2 up and down by pressure of the hydraulic oil (fluid) supplied to the workpiece lifter 28 via the sub-flow paths F2 of the jig 2. When the hydraulic pressure is supplied to a workpiece lifting flow path (not shown) formed in the workpiece lifter 28, the workpiece W supported by a workpiece receiving portion of the workpiece lifter 28 is moved up. On the contrary, when the hydraulic pressure is supplied to a workpiece lowering flow path (not shown) formed in the workpiece lifter 28, the workpiece W supported by the workpiece receiving portion of the workpiece lifter 28 is moved down. That is, two (routes) of the four (routes) sub-flow paths F2 are used as the flow paths for the workpiece lifter 28.

As illustrated in FIG. 5, the table 4 includes a rotary table 41 to which the jig 2 is attached and a tilt table 42 which supports the rotary table 41. The rotary table 41 has a disk shape and is formed with table flow paths F3 to communicate with the main flow paths F1 of the jig 2. The tilt table 42 is in a U-shape and is formed with table flow paths F6 to communicate with the main flow paths F1 of the jig 2.

A rotating shaft 43 is fixed to a lower center of the rotary table 41. The rotating shaft 43 has rotating shaft flow paths F4 to communicate with the table flow paths F3. The table 4 includes a support member 45 to rotatably support the rotating shaft 43 about the axis of the rotating shaft 43. Accordingly, the rotary table 41 and also the workpiece W are rotated about an axis B (see FIG. 2). The support member 45 has supply flow paths F5.

A rotating shaft 44 is fixed to a left end of the tilt table 42. The rotating shaft 44 has rotating shaft flow paths F7 to communicate with the table flow paths F6. The support base 6 includes a support member 61 to rotatably support the rotating shaft 44 about an axis of the rotating shaft 44. Accordingly, the tilt table 42 and also the workpiece W are tilted about an axis A (see FIG. 2). The support member 61 has supply flow paths F8. Further, a rotating shaft (not shown) is fixed to a right end of the tilt table 42 and is rotatably supported by a support member (not shown) provided in the support base 7.

The table 4 has a flow path connector 46 to connect the rotating shaft flow paths F4 of the rotating shaft 43 with the supply flow paths F5 to communicate with a fluid-supply side so as to relatively rotate with each other about the axis of the rotating shaft 43. Specifically, the flow path connector 46 is a rotary joint to connect the rotating shaft flow paths F4 of the rotating shaft 43 with the supply flow paths F5 of the support member 45 so as to relatively rotate with each other about the axis of the rotating shaft 43, with the shaft sealed by a seal member 47. The rotating shaft flow paths F4 is connected with the supply flow paths F5 via an annular groove 48 formed in at least one of an outer peripheral surface of the rotating shaft 43 and an inner peripheral surface of the support member 45.

The support base 6 has a flow path connector 62 to connect the rotating shaft flow paths F7 of the rotating shaft 44 with the supply flow paths F8 to communicate with the fluid-supply side so as to relatively rotate with each other about the axis of the rotating shaft 44. Specifically, the flow path connector 62 is a rotary joint to connect the rotating shaft flow paths F7 of the rotating shaft 44 with the supply flow paths F8 of the support member 61 so as to relatively rotate with each other about the axis of the rotating shaft 44, with the shaft sealed by a seal member 63. The rotating shaft flow paths F7 is connected with the supply flow paths F8 via an annular groove 64 formed in at least one of an outer peripheral surface of the rotating shaft 44 and an inner peripheral surface of the support member 64.

As shown in FIGS. 2 and 6, the carriage 8 is provided to be moved in the Z-axis direction (front-rear direction). Accordingly, the workpiece support device 1 is moved in the Z-axis direction (front-rear direction) relative to the base 101 (see FIG. 1), except the fixed member 9.

The fixed member 9 has supply-side connecting portions 91 to flow the fluid supplied from supply flow paths F9. The supply-side connecting portions 91 are moved relative to the jig 2, to communicate with and block off the sub-flow paths F2. In the present embodiment, the fixed member 9 is provided to be fixed to the base 101 (see FIG. 1). The relative movement between the jig 2 and the supply-side connecting portions 91 is performed by a mechanism of moving in a feed shaft direction (Z-axis direction) of the machine tool 100 (see FIG. 1) on which the workpiece support device 1 is mounted.

The jig 2 has jig-side connecting portions 31 formed at open ends of the sub-flow paths F2 to keep fluid pressure in the sub-flow paths F2. The supply-side connecting portions 91 are moved relative to the jig 2, to be attached to and detached from the jig-side connecting portions 31. That is, the jig-side connecting portions 31 and the supply-side connecting portions 91 are connected with each other when moved to contact with each other and then pressed against each other, and are disconnected when moved apart from each other. As the jig-side connecting portions 31 and the supply-side connecting portions 91, an automatic fluid supply coupling device may be used, for example, which is called an auto-coupler.

Next, a description is given of operation of the machine tool 100 mounted with the workpiece support device 1 having a structure as described above.

At the beginning, the carriage 8 is moved forward (indicated by an arrow D in FIGS. 2 and 6), which is a carry-in position of the workpiece W into the machine tool 100 (see FIG. 1). This allows the jig-side connecting portions 31 of the jig 2 to be connected with the supply-side connecting portions 91 of the fixed member 9 so that the supply flow paths F9 of the fixed member 9 communicate with the sub-flow paths F2 of the jig 2. The hydraulic oil is supplied to the unclamping flow paths of the workpiece clamping devices 22 via the main flow paths F1 of the jig 2, to unclamp the workpiece clamping devices 22 with the distal ends of the levers 23 moved up.

Subsequently, the hydraulic oil is supplied to the workpiece lifting flow path of the workpiece lifter 28 via the sub-flow path F2 of the jig 2. Then, the workpiece receiving portion of the workpiece lifter 28 is moved up by the hydraulic pressure. After the workpiece W has been delivered on the workpiece receiving portion of the workpiece lifter 28 in a lifted position, the hydraulic oil is supplied to the workpiece lowering flow path of the workpiece lifter 28 via the sub-flow path F2 of the jig 2. Consequently, the workpiece receiving portion of the workpiece lifter 28, together with the workpiece W, is moved down by the hydraulic pressure. Accordingly, the workpiece W is smoothly fitted onto the locator pins 27 and placed on the clamp pedestals 24 and 25.

The hydraulic oil is supplied to the clamping flow paths of the workpiece clamping devices 22 via the main flow path F1 of the jig 2, and the distal ends of the levers 23 are moved down to render the workpiece clamping devices 22 in a clamping state. Thus, the workpiece W is clamped.

Further, the air is supplied to the seating detectors 26 via the main flow paths F1 of the jig 2. When it is found that the pressure in the seating detection paths of the seating detectors 26 has hardly decreased, it is detected that the workpiece W is seated on the clamp pedestals 24 in a correct posture.

When it is detected that the workpiece W is seated on the clamp pedestals 24 in a correct posture, the carriage 8 is moved rearward to a machining position for the workpiece W. This causes the jig-side connecting portions 31 of the jig 2 to be detached from the supply-side connecting portions 91 of the fixed member 9, to block off the communication between the supply flow paths F9 of the fixed member 9 and the sub-flow paths F2 of the jig 2.

Then, the machine tool 100 performs machining on the workpiece W located at the machining position. Even during the machining, the hydraulic oil is supplied to the clamping flow paths of the workpiece clamping devices 22 via the main flow path F1 of the jig 2, to keep the workpiece clamping devices 22 in a clamping state. Further, even during the machining, the air is supplied to the seating detectors 26 via the main flow paths F1 of the jig 2, to execute seating detection by the seating detectors 26.

As described above, the workpiece support device 1 of the present embodiment includes the jig 2, the table 4, the rotating shafts 43, 44, the support members 45, 61, the flow path connectors 46, 62, and the supply-side connecting portions 91. The jig 2 has the main flow paths F1 to flow the fluid required for machining and the sub-flow paths F2 different from the main flow paths F1, and is used to fix the workpiece W. The table 4 has the table flow paths F3, F6 to communicate with the main flow paths F1 and is attached with the jig 2. The rotating shaft 43 has the rotating shaft flow paths F4 to communicate with the table flow paths F3 and is fixed to the rotary table 41 of the table 4. The rotating shaft 44 has the rotating shaft flow paths F7 to communicate with the table flow paths F6 and is fixed to the tilt table 42 of the table 4. The support members 45, 61 rotatably support the rotating shafts 43, 44. The flow path connectors 46, 62 connect the rotating shaft flow paths F4, F7 of the rotating shafts 43, 44 with the supply flow paths F5, F8 to communicate with the fluid-supply side so as to relatively rotate with each other about the axes of the rotating shafts 43, 44. The supply-side connecting portions 91 are moved relative to the jig 2 to communicate with, for flowing the supplied fluid, and block off the sub-flow paths F2.

With this structure, at the time of machining the workpiece W, the fluid required for machining is supplied to the jig 2 via the rotating shafts 43, 44 and through the main flow paths F1 of the jig 2. Accordingly, the fluid is supplied in the main flow paths F1 of the jig 2 at any time of machining the workpiece W, so that a situation of the workpiece W being displaced on the jig 2 during machining can be handled. Meanwhile, when the workpiece W is not machined such as when the workpiece W is set on the jig 2, the jig 2 and the supply-side connecting portions 91 are moved relatively close to each other so that the supply-side connecting portions 91 are communicated with the sub-flow paths F2 of the jig 2. Then, the fluid is supplied to the jig 2 via the sub-flow paths F2 of the jig 2. Thus, it is not required to supply the fluid to the workpiece lifter 28, which is not necessary for machining itself, or the like via the rotating shafts 43, 44. Accordingly, flow paths to communicate with the sub-flow paths F2 of the jig 2 do not need to be formed in the flow path connectors 46, 62, so that the flow path connectors 46, 62 are prevented from being elongated and having an increased diameter.

Therefore, according to the present embodiment, the workpiece support device 1 which is reduced in size and weight is provided, while reliability of machining operation is improved.

Further, with the reduced size and weight of the workpiece support device 1, operation speed is increased. Still further, the seal members 47, 63 for defining the flow paths are reduced to allow sliding resistance applied to the rotating shafts 43 and 44 to be reduced so that energy saving is achieved.

Further, in the present embodiment, the support members 45, 61 have the supply flow paths F5, F8. In this case, the flow path connectors 46, 62 are rotary joints which connect the rotating shaft flow paths F4, F7 with the supply flow paths F5, F8 so as to rotate relative to each other about the axes of the respective rotating axes 43, 44, with the shaft sealed by the seal members 47, 63. With this structure, the rotary joints are used to reliably define flow paths of different routes in a limited space, so as to flow the fluid from a fixed portion to a rotating portion. Therefore, the flow path connectors 46, 62 are more reduced in size.

Note that, in the flow path connectors 46, 62, hoses may be used as the supply flow paths F5, F8, to have each arranged in a cable carrier (cable bear (registered trademark), for example) which is made of resin, and protects and guides the hose at a movable portion.

Further, in the present embodiment, the relative movement between the jig 2 and the supply-side connecting portions 91 is performed by the mechanism of moving in the feed shaft direction of the machine tool 100 on which the workpiece support device 1 is mounted. With this structure, the mechanism of moving in the feed shaft direction of the machine tool 100 is used as a mechanism for the relative movement between the jig 2 and the supply-side connecting portions 91, to allow the workpiece support device 1 to have a simpler and smaller structure.

Further, in the present embodiment, the jig 2 has the jig-side connecting portions 31 formed at the open ends of the sub-flow paths F2 to keep the fluid pressure in the sub-flow paths F2. In this case, the supply-side connecting portions 91 are moved relative to the jig 2 so as to be attached to and detached from the jig-side connecting portions 31. In this structure, the supply-side connecting portions 91 are attached to and detached from the jig-side connecting portions 31 formed in the jig 2, to directly communicate with and block off the sub-flow paths F2 of the jig 2. Still further, the fluid pressure is kept in the sub-flow paths F2 of the jig 2 so that leakage of the fluid to an outside is prevented, and the devices such as the workpiece lifter 28, to be operated by the fluid of the workpiece posture controller and the like are kept in a predetermined state.

Note that the supply-side connecting portions 91 may be attached to and detached from a table-side connecting portions formed in the rotary table 41 to keep the fluid pressure, for example. In this case, the rotary table 41 needs to be formed with flow paths to communicate with the open ends of the sub-flow paths F2 of the jig 2. With this structure, the jig-side connecting portions 31 to keep the fluid pressure inside are not required for each jig 2.

Further, in the present embodiment, the fluid required for machining includes air to be supplied to the seating detectors 26 provided on the jig 2 to detect seating of the workpiece W on the jig 2. With this structure, the air is supplied to the seating detectors 26 via the main flow paths F1 of the jig 2 at any time of machining the workpiece W. Accordingly, if the workpiece W is not in close contact with a seating surface of the jig 2, the air supplied to the seating detectors 26 leaks so that a decrease in air pressure can be detected. Therefore, a situation of the workpiece W being displaced on the jig 2 can be handled by executing error processing such as stopping operation of the machine tool 100 and/or giving warning, for example.

Further, in the present embodiment, the fluid required for machining includes hydraulic oil to be supplied to the workpiece clamping devices 22 which are provided on the jig 2 to clamp the workpiece W. With this structure, the hydraulic oil is supplied to the workpiece clamping devices 22 via the main flow path F1 of the jig 2 at any time of machining the workpiece W. This reliably gives a clamping force to the workpiece W during the machining. Therefore, the workpiece W is prevented from being displaced on the jig 2.

The present invention has been described above based on the embodiment, but is not limited to the structure described in the embodiment. The structure of the present invention may be appropriately modified within a range not departing from the gist thereof, including appropriately combining or selecting the structure described in the embodiment described above. Further, a part of the structure of the embodiment described above may be added, deleted, or replaced.

For example, in the embodiment described above, the fluids supplied via the main flow paths F1 of the jig 2 are the air to be supplied to the seating detectors 26 and the hydraulic oil to be supplied to the workpiece clamping devices 22, but are limited thereto. The fluid supplied via the main flow paths F1 of the jig 2 may be only the air supplied to the seating detectors 26. In this case, if the workpiece W is displaced on the jig 2, the error processing is executed to handle that problem, and the workpiece support device 1 is reduced in size and weight.

Further, the fluid to be supplied via the sub-flow paths F2 of the jig 2 is not limited to the fluid to be supplied to the workpiece lifter 28. For example, a cleaning coolant or air for detecting a rod end of a hydraulic cylinder of the workpiece lifter 28 may also be supplied via the sub-flow paths F2. Further, a fluid supplied to the workpiece posture controller for rough positioning, such as hydraulic oil for clamping and unclamping a cassette jig, and air for detecting seating of the cassette jig, may be also supplied via the sub-flow paths F2.

Further, the workpiece support device 1 may be configured such that the workpiece W can be either tilted about the axis A or rotated about the axis B. In this case, either one of the flow path connectors 46, 62 is used.

Further, in the embodiment described above, the relative movement between the jig 2 and the supply-side connecting portions 91 is performed by the mechanism of moving in the feed shaft direction of the machine tool 100 on which the workpiece support device 1 is mounted, but is not limited thereto. The supply-side connecting portions 91 may be configured to move with respect to the jig 2.

Further, in the embodiment described above, the relative movement between the jig 2 and the supply-side connecting portions 91 is performed in the Z-axis direction, but is not limited thereto and may be performed in the X-axis direction or the Y-axis direction.

Further, in the above-described embodiment, the horizontal-type machine tool 100 has been described, but the present invention is not limited thereto. The present invention is also applicable to various machine tools such as a vertical-type machine tool.

REFERENCE SYMBOLS

1: workpiece support device; 2: jig; 21: jig body; 22: workpiece clamping device; 26: seating detector; 28: workpiece lifter; 31: jig-side connecting portion; 4: table; 41: rotary table (table); 42: tilt table (table); 43, 44: rotating shaft; 45, 61: support member; 46, 62: flow path connector; 47, 63: seal member; 6,7: support base; 8: carriage; 9: fixed member; 91: supply-side connecting portion; 100: machine tool; F1: main flow path; F2: sub-flow path; F3, F6: table flow path; F4, F7: rotating shaft flow path; F5, F8: supply flow path; W: workpiece

What is claimed is:

1. A workpiece support device for supporting a workpiece as an object to be machined, comprising:
    a jig having a main flow path to flow a fluid required for machining and a sub-flow path different from the main flow path, and to fix the workpiece;
    a table having a table flow path to communicate with the main flow path, and being attached with the jig;
    a rotating shaft having a rotating shaft flow path to communicate with the table flow path, and being connected to the table;
    a support member supporting the rotating shaft during rotation;
    a flow path connector connecting the rotating shaft flow path of the rotating shaft with a fluid-supply path to communicate with a fluid-supply side so as to relatively rotate the rotating shaft flow path and the fluid-supply path about an axis of the rotating shaft; and
    a supply-side connecting portion moving relative to the jig to communicate with and to block off the sub-flow path, and flowing a supplied fluid.

2. The workpiece support device as claimed in claim 1, wherein the support member has a supply flow path, and
    the flow path connector is a rotary joint to connect the rotating shaft flow path of the rotating shaft with the supply flow path of the support member so as to relatively rotate the rotating shaft flow path and the supply flow path about the axis of the rotating shaft, with the shaft sealed by a seal member.

3. The workpiece support device as claimed in claim 1, wherein relative movement between the jig and the supply-side connection portion is performed by a mechanism of moving in a feed shaft direction of a machine tool on which the workpiece support device is mounted.

4. The workpiece support device as claimed in claim 1, wherein the jig has a jig-side connection portion formed at an open end of the sub-flow path to keep fluid pressure in the sub-flow path, and
    the supply-side connecting portion is moved relative to the jig, to be attached to and detached from the jig-side connection portion.

5. The workpiece support device as claimed in claim 1, wherein the fluid required for machining includes air to be supplied to a seating detector provided on the jig to detect seating of the workpiece on the jig.

6. The workpiece support device as claimed in claim 1, wherein the fluid required for machining includes hydraulic oil to be supplied to a workpiece clamping device provided on the jig to clamp the workpiece.

7. The workpiece support device as claimed in claim 5, wherein the fluid required for machining includes hydraulic oil to be supplied to a workpiece clamping device provided on the jig to clamp the workpiece.

\* \* \* \* \*